US009922027B2

United States Patent
Brophy et al.

(10) Patent No.: US 9,922,027 B2
(45) Date of Patent: *Mar. 20, 2018

(54) LANGUAGE TRANSLATION AND WORK ASSIGNMENT OPTIMIZATION IN A CUSTOMER SUPPORT ENVIRONMENT

(71) Applicant: International Business Machines Corporation, Armonk, NY (US)

(72) Inventors: Gary R. Brophy, Byron, MN (US); Dennis D. Koski, Oronoco, MN (US); Todd A. Mueller, Rochester, MN (US); Jeffrey A. Schmidt, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/397,818

(22) Filed: Jan. 4, 2017

(65) Prior Publication Data

US 2017/0118346 A1    Apr. 27, 2017

Related U.S. Application Data

(63) Continuation of application No. 14/523,002, filed on Oct. 24, 2014, now Pat. No. 9,569,430.

(51) Int. Cl.
*G06F 17/28* (2006.01)
*H04M 3/523* (2006.01)

(52) U.S. Cl.
CPC .......... *G06F 17/28* (2013.01); *G06F 17/289* (2013.01); *G06F 17/2836* (2013.01);
(Continued)

(58) Field of Classification Search
CPC ..... G06F 17/28; G06F 17/289; G06F 17/2854
(Continued)

(56) References Cited

U.S. PATENT DOCUMENTS

| 6,704,410 B1 | 3/2004 | McFarlane et al. |
| 6,978,006 B1 | 12/2005 | Polycyn |

(Continued)

OTHER PUBLICATIONS

"Beyond ACD—The advantages of skill-based routing in today's contact centers", Nortel Networks 2003, http://www.trcnetworks.com/nortel/nortel%20phones/systems.pdf/call-center/Beyond%20ACD.pdf., 12 pages.

(Continued)

*Primary Examiner* — Shaun Roberts
(74) *Attorney, Agent, or Firm* — William H. Hartwell; Madeline F. Schiesser; Keohane & D'Alessandro, PLLC

(57) ABSTRACT

Approaches presented herein enable assignment of translated work to an agent in a customer support environment based on a confidence factor that measures accuracy of translation and an agent's language skill. Specifically, agent proficiencies in a set of natural languages are measured and scored. An incoming customer communication is translated into one or more natural languages and each language translation is assigned a translation score based on a confidence of translation. The skill score and translation score are utilized to calculate a confidence factor for each language. In one approach, the customer communication is assigned to an agent that has a confidence factor greater than a predetermined threshold confidence factor. In another approach, the communication is only assigned if a rule optimizing agent availability and risk of constrained resources is satisfied.

20 Claims, 6 Drawing Sheets

(52) U.S. Cl.
CPC ....... *G06F 17/2854* (2013.01); *H04M 3/5233* (2013.01); *H04M 3/5238* (2013.01); *H04M 2242/12* (2013.01)

(58) Field of Classification Search
USPC ........................................................ 704/2–8
See application file for complete search history.

(56) References Cited

U.S. PATENT DOCUMENTS

| | | |
|---|---|---|
| 7,103,171 B1 | 9/2006 | Annadata et al. |
| 7,536,294 B1 | 5/2009 | Stanz et al. |
| 7,961,866 B1 | 6/2011 | Boutcher et al. |
| 8,112,391 B2 | 2/2012 | Allen et al. |
| 8,447,027 B2 | 5/2013 | Lin et al. |
| 2001/0029455 A1 | 10/2001 | Chin et al. |
| 2002/0103632 A1 | 8/2002 | Dutta et al. |
| 2003/0169870 A1 | 9/2003 | Stanford |
| 2007/0294076 A1 | 12/2007 | Shore et al. |
| 2008/0162114 A1 | 7/2008 | Torres-Rocca et al. |
| 2012/0240039 A1 | 9/2012 | Walker et al. |
| 2013/0124185 A1 | 5/2013 | Sarr et al. |
| 2016/0117628 A1 | 4/2016 | Brophy et al. |

OTHER PUBLICATIONS

Roberts, Shaun, U.S. Appl. No. 14/523,002, Office Action dated Apr. 20, 2016, 17 pages.
Roberts, Shaun, U.S. Appl. No. 14/523,002, Final Office Action dated Aug. 3, 2016, 15 pages.
Roberts, Shaun, U.S. Appl. No. 14/523,002, Notice of Allowance dated Oct. 7, 2016, 13 pages.

RESOURCE LANGUAGE SKILL
402

| RESOURCE | LANGUAGE | LANGUAGE SKILL |
|---|---|---|
| RC1 | ENGLISH | 100 |
| RC1 | FRENCH | 75 |
| RC2 | GERMAN | 90 |
| RC2 | SPANISH | 60 |
| RC3 | ENGLISH | 80 |
| RC3 | SPANISH | 90 |

↙ 435

+

LANGUAGE TRANSLATION SCORE
404

| LANGUAGE | TRANSLATION CONFIDENCE FACTOR |
|---|---|
| ENGLISH | 95 |
| FRENCH | 75 |
| GERMAN | 50 |
| SPANISH | 90 |

↙ 415

=

CONFIDENCE FACTOR
406

| RESOURCE | LANGUAGE | CONFIDENCE FACTOR |
|---|---|---|
| RC1 | ENGLISH | 195 |
| RC1 | FRENCH | 150 |
| RC2 | GERMAN | 140 |
| RC2 | SPANISH | 150 |
| RC3 | ENGLISH | 175 |
| RC3 | SPANISH | 180 |

LANGUAGE TRANSLATION AND WORK ASSIGNMENT OPTIMIZATION IN A CUSTOMER SUPPORT ENVIRONMENT

The present patent document is a continuation of U.S. patent application Ser. No. 14/523,002, filed Oct. 24, 2014, entitled "LANGUAGE TRANSLATION AND WORK ASSIGNMENT OPTIMIZATION IN A CUSTOMER SUPPORT ENVIRONMENT", the disclosure of which is incorporated herein by reference.

TECHNICAL FIELD

This invention relates generally to workflow in a customer support environment and, more specifically, to assigning work based on language.

BACKGROUND

In a typical system in which work is assigned to resources, such as in a customer support center, for example, a communication from the customer often comes into the system with language as a specific attribute. This communication can be in the form of a voice communication, a textual communication, a video communication, and/or the like. Such a communication is generally routed to a queue until a resource (i.e., a human agent) is available to assist the customer. When a communication enters the system, the set of resources that can work on the communication may be constrained, resulting in the call being held in the queue for an extended period of time. Further, the set of resources may include resources that are fluent in different natural languages in order to effectively process the communication.

SUMMARY

In general, embodiments described herein provide assignment of translated work to an agent in a customer support environment based on a confidence factor that measures accuracy of translation and an agent's language skill. Specifically, agent proficiencies in a set of natural languages are measured and scored. An incoming customer communication is translated into one or more natural languages and each language translation is assigned a translation score based on a confidence of translation. The skill score and translation score are utilized to calculate a confidence factor for each language. In one approach, the customer communication is assigned to an agent that has a confidence factor greater than a predetermined threshold confidence factor. In another approach, the communication is only assigned if a rule optimizing agent availability and risk of constrained resources is satisfied.

One aspect of the present invention includes a method for assigning work in a customer support environment, the method comprising the computer-implemented steps of: translating a customer communication received in a first language into a second language, the translation having a confidence of translation; obtaining a set of agents, each agent of the set of agents having an associated confidence factor based upon the confidence of translation and a language proficiency of the agent in at least one of the first language or the second language; generating a threshold confidence factor curve comprising a first curve, having a first rate of decrease over a first wait time period of the customer communication, and a second curve, having a second rate of decrease over a second wait time of the customer communication, the second rate of decrease being greater than the first rate of decrease; and assigning, at a time, the customer communication to one of the set of agents based on the associated confidence factor being greater than the threshold confidence factor curve at the time.

Another aspect of the present invention includes a system for assigning work in a customer support environment, comprising: a memory medium comprising program instructions; a bus coupled to the memory medium; and a processor, for executing the program instructions, coupled to a confidence factor management engine via the bus that when executing the program instructions causes the system to: translate a customer communication received in a first language into a second language, the translation having a confidence of translation; obtain a set of agents, each agent of the set of agents having an associated confidence factor based upon the confidence of translation and a language proficiency of the agent in at least one of the first language or the second language; generate a threshold confidence factor curve comprising a first curve, having a first rate of decrease over a first wait time period of the customer communication, and a second curve, having a second rate of decrease over a second wait time of the customer communication, the second rate of decrease being greater than the first rate of decrease; and assign, at a time, the customer communication to one of the set of agents based on the associated confidence factor being greater than the threshold confidence factor curve at the time.

Yet another aspect of the present invention includes a computer program product for assigning work in a customer support environment, the computer program product comprising a computer readable storage device, and program instructions stored on the computer readable storage device, to: translate a customer communication received in a first language into a second language, the translation having a confidence of translation; obtain a set of agents, each agent of the set of agents having an associated confidence factor based upon the confidence of translation and a language proficiency of the agent in at least one of the first language or the second language; generate a threshold confidence factor curve comprising a first curve, having a first rate of decrease over a first wait time period of the customer communication, and a second curve, having a second rate of decrease over a second wait time of the customer communication, the second rate of decrease being greater than the first rate of decrease; and assign, at a time, the customer communication to one of the set of agents based on the associated confidence factor being greater than the threshold confidence factor curve at the time.

Yet still another aspect of the present invention includes a method for deploying a system for assigning work in a customer support environment, comprising: providing a computer infrastructure that includes at least one computer device that operates to perform the steps of: translating a customer communication received in a first language into a second language, the translation having a confidence of translation; obtaining a set of agents, each agent of the set of agents having an associated confidence factor based upon the confidence of translation and a language proficiency of the agent in at least one of the first language or the second language; generating a threshold confidence factor curve comprising a first curve, having a first rate of decrease over a first wait time period of the customer communication, and a second curve, having a second rate of decrease over a second wait time of the customer communication, the second rate of decrease being greater than the first rate of decrease; and assigning, at a time, the customer communication to one of the set of agents based on the associated confidence factor being greater than the threshold confidence factor curve at the time.

BRIEF DESCRIPTION OF THE SEVERAL VIEWS OF THE DRAWINGS

These and other features of this invention will be more readily understood from the following detailed description of the various aspects of the invention taken in conjunction with the accompanying drawings in which:

FIG. 4 shows a set of tables according to illustrative embodiments;

Figure 1:
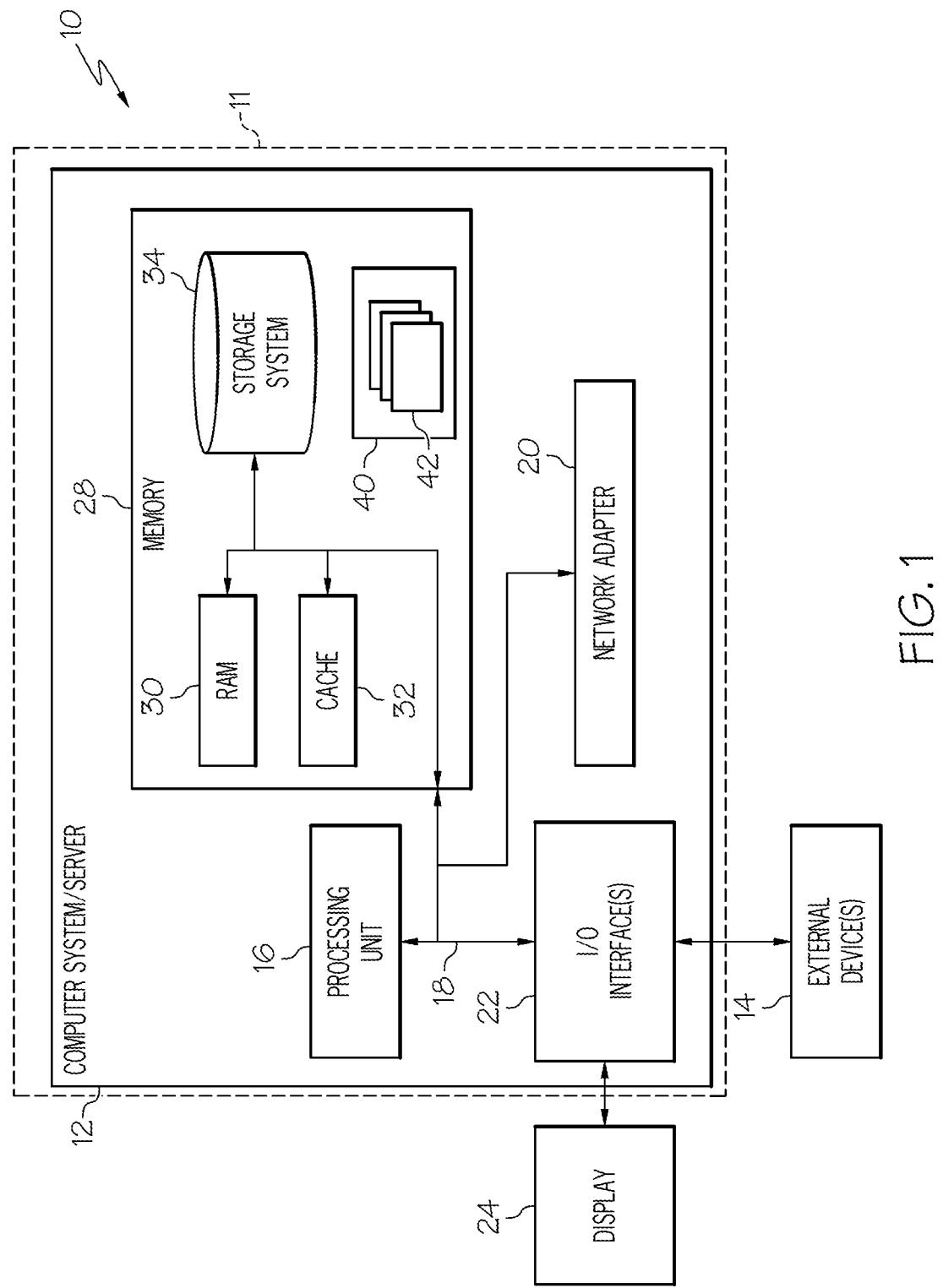
FIG. 1 shows an architecture in which the invention may be implemented according to illustrative embodiments.

The drawings are not necessarily to scale. The drawings are merely representations, not intended to portray specific parameters of the invention. The drawings are intended to depict only typical embodiments of the invention, and therefore should not be considered as limiting in scope. In the drawings, like numbering represents like elements.

DETAILED DESCRIPTION

Exemplary embodiments will now be described more fully herein with reference to the accompanying drawings, in which exemplary embodiments are shown. It will be appreciated that this disclosure may be embodied in many different forms and should not be construed as limited to the exemplary embodiments set forth herein. Rather, these exemplary embodiments are provided so that this disclosure will be thorough and complete and will fully convey the scope of this disclosure to those skilled in the art.

Furthermore, the terminology used herein is for the purpose of describing particular embodiments only and is not intended to be limiting of this disclosure. As used herein, the singular forms "a", "an", and "the" are intended to include the plural forms as well, unless the context clearly indicates otherwise. Furthermore, the use of the terms "a", "an", etc., do not denote a limitation of quantity, but rather denote the presence of at least one of the referenced items. It will be understood that elements numbered as "_A-N" denote a set having at least one of the referenced item, and an element numbered as "_N" denotes any member of that set. Furthermore, similar elements in different figures may be assigned similar element numbers. It will be further understood that the terms "comprises" and/or "comprising", or "includes" and/or "including", when used in this specification, specify the presence of stated features, regions, integers, steps, operations, elements, and/or components, but do not preclude the presence or addition of one or more other features, regions, integers, steps, operations, elements, components, and/or groups thereof.

Unless specifically stated otherwise, it may be appreciated that terms such as "processing," "detecting," "determining," "evaluating," "receiving," or the like, refer to the action and/or processes of a computer or computing system, or similar electronic data center device, that manipulates and/or transforms data represented as physical quantities (e.g., electronic) within the computing system's registers and/or memories into other data similarly represented as physical quantities within the computing system's memories, registers or other such information storage, transmission or viewing devices. The embodiments are not limited in this context.

As stated above, embodiments described herein provide assignment of translated work to an agent in a customer support environment based on a confidence factor that measures accuracy of translation and an agent's language skill. Specifically, agent proficiencies in a set of natural languages are measured and scored. An incoming customer communication is translated into one or more natural languages and each language translation is assigned a translation score based on a confidence of translation. The skill score and translation score are utilized to calculate a confidence factor for each language. In one approach, the customer communication is assigned to an agent that has a confidence factor greater than a predetermined threshold confidence factor. In another approach, the communication is only assigned if a rule optimizing agent availability and risk of constrained resources is satisfied.

The inventors of the present invention have discovered that in a customer support system that answers calls and communications from around the world in a plurality of languages, a center that distributes calls and communications only to native speakers of the incoming communication may become inefficient. Agents speaking some languages that are in high demand may be heavily constrained, while other agents speaking other languages may have little work. This can result in some customer problems being delayed while some resources remain underutilized.

The approaches described herein contain numerous advantages over present methods including, but not limited to, greatly improved efficiency of a diverse global team with multiple language skills by shifting work to underutilized speakers, moving work items in the queue to a resource faster by making all resources in all languages available, altering thresholds dynamically to decide if or when a translation should be done based on problem attributes, and freeing up higher skilled or in-demand language skills by translating lower difficulty problems to another language.

Referring now to FIG. 1, a computerized implementation 10 of an embodiment for assigning work in a customer support environment will be shown and described. Computerized implementation 10 is only one example of a suitable implementation and is not intended to suggest any limitation as to the scope of use or functionality of embodiments of the invention described herein. Regardless, computerized implementation 10 is capable of being implemented and/or performing any of the functionality set forth hereinabove.

In computerized implementation 10, there is a computer system 12, deployed within a computer infrastructure 11, and which is operational with numerous other general purpose or special purpose computing system environments or configurations. Examples of well-known computing systems, environments, and/or configurations that may be suitable for use with computer system 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

This is intended to demonstrate, among other things, that the present invention could be implemented within a network environment (e.g., the Internet, a wide area network (WAN), a local area network (LAN), a virtual private network (VPN), etc.), a cloud computing environment, a cellular network, or on a stand-alone computer system. Communication throughout the network can occur via any combination of various types of communication links. For example, the communication links can comprise addressable connections that may utilize any combination of wired and/or wireless transmission methods. Where communications occur via the Internet, connectivity could be provided by conventional TCP/IP sockets-based protocol, and an Internet service provider could be used to establish connectivity to the Internet. Still yet, computer infrastructure 11 is intended to demonstrate that some or all of the components of implementation 10 could be deployed, managed, serviced, etc., by a service provider who offers to implement, deploy, and/or perform the functions of the present invention for others.

Computer system 12 is intended to represent any type of computer system that may be implemented in deploying/realizing the teachings recited herein. Computer system 12 may be described in the general context of computer system executable instructions, such as program modules, being executed by a computer system. Generally, program modules may include routines, programs, objects, components, logic, data structures, and so on, that perform particular tasks or implement particular abstract data types. In this particular example, computer system 12 represents an illustrative system for assigning work in a customer support environment. It should be understood that any other computers implemented under the present invention may have different components/software, but can perform similar functions.

Referring now to FIG. 1, computer system 12 in computerized implementation 10 is shown in the form of a general-purpose computing device. The components of computer system 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Processing unit 16 refers, generally, to any apparatus that performs logic operations, computational tasks, control functions, etc. A processor may include one or more subsystems, components, and/or other processors. A processor will typically include various logic components that operate using a clock signal to latch data, advance logic states, synchronize computations and logic operations, and/or provide other timing functions. During operation, processing unit 16 collects and routes signals representing inputs and outputs between external devices 14 and input devices (not shown). The signals can be transmitted over a LAN and/or a WAN (e.g., T1, T3, 56 kb, X.25), broadband connections (ISDN, Frame Relay, ATM), wireless links (802.11, Bluetooth, etc.), and so on. In some embodiments, the signals may be encrypted using, for example, trusted key-pair encryption. Different systems may transmit information using different communication pathways, such as Ethernet or wireless networks, direct serial or parallel connections, USB, Firewire®, Bluetooth®, or other proprietary interfaces. (Firewire is a registered trademark of Apple Computer, Inc. Bluetooth is a registered trademark of Bluetooth Special Interest Group (SIG)).

In general, processing unit 16 executes computer program code, such as program code for assigning work in a customer support environment, which is stored in memory 28, storage system 34, and/or program/utility 40. While executing computer program code, processing unit 16 can read and/or write data to/from memory 28, storage system 34, and program/utility 40.

Computer system 12 typically includes a variety of computer system readable media. Such media may be any available media that is accessible by computer system 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media, (e.g., VCRs, DVRs, RAID arrays, USB hard drives, optical disk recorders, flash storage devices, and/or any other data processing and storage elements for storing and/or processing data). By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM, or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program code embodied on a computer readable medium may be transmitted using any appropriate medium including, but not limited to, wireless, wireline, optical fiber cable, radio-frequency (RF), etc., or any suitable combination of the foregoing.

Program/utility 40, having a set (at least one) of program modules 42, may be stored in memory 28 by way of example, and not limitation. Memory 28 may also have an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a consumer to interact with computer system/server 12; and/or any devices (e.g., network card, modem, etc.) that enable computer system/server 12 to communicate with one or more other computing devices. Such communication can occur via I/O interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples include, but are not limited to: microcode, device drivers, redundant processing units, external disk drive arrays, RAID systems, tape drives, and data archival storage systems, etc.

Figure 2:
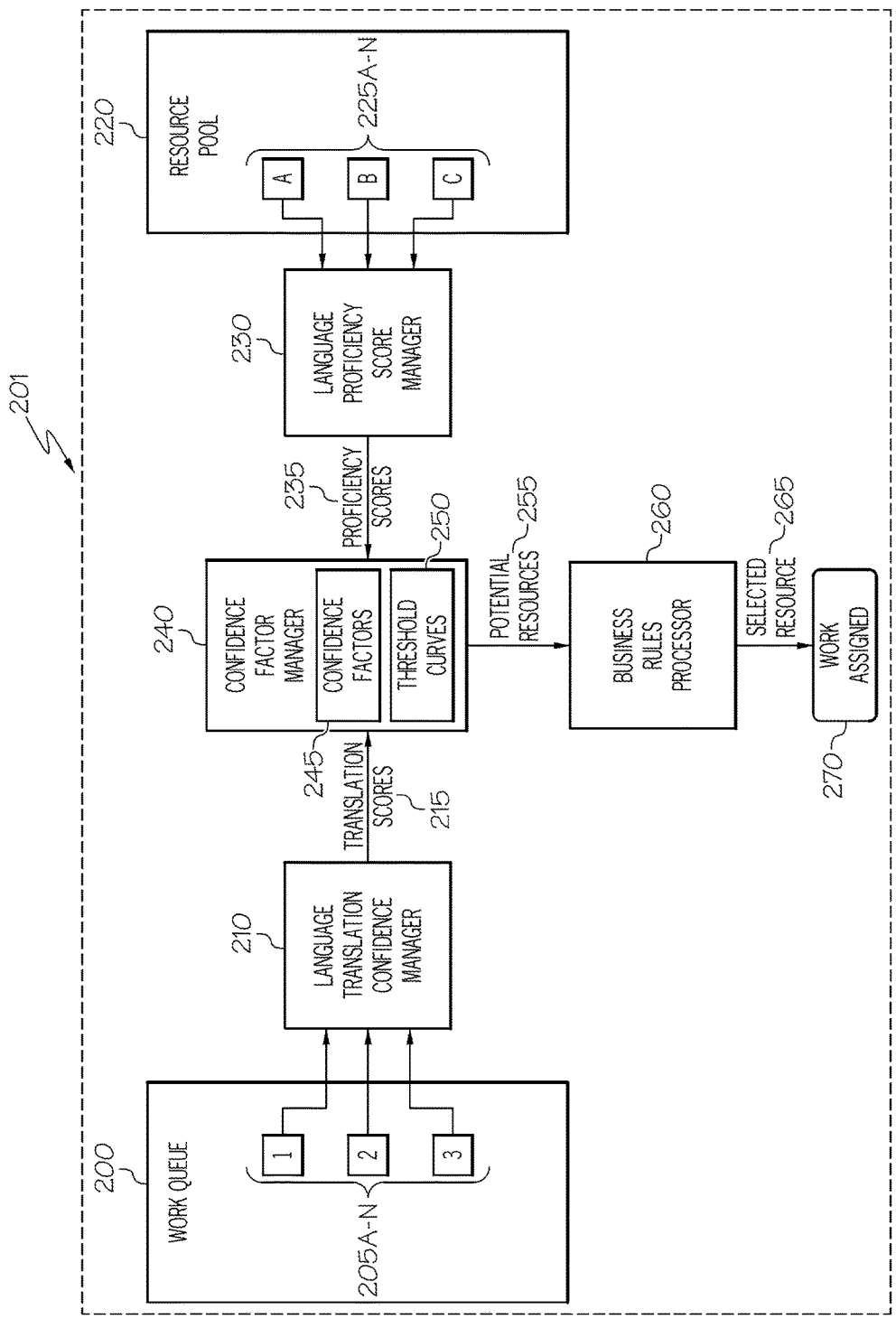
FIG. 2 shows a more detailed system architecture according to illustrative embodiments.

Referring now to FIG. 2, a more detailed system architecture according to illustrative embodiments is shown. Resource Pool 220 in Work Management System 201 of a Customer Support Environment is shown. Resource Pool 220 comprises one or more Resources 225A-N. Resources 225A-N may include customer support agents in a call center or other assistance center, with each resource 225A-N representing a person who can provide support to customers. A Resource 225N may enter Resource Pool 220 (e.g., by becoming available during certain parts of the day (i.e. work shifts), by clocking in, signing in, or by otherwise entering Work Management System 201). In some embodiments, Resource Pool 220 represents an available customer support workforce and in some embodiments may be international and/or be dispersed across multiple locations globally.

Figure 3A:
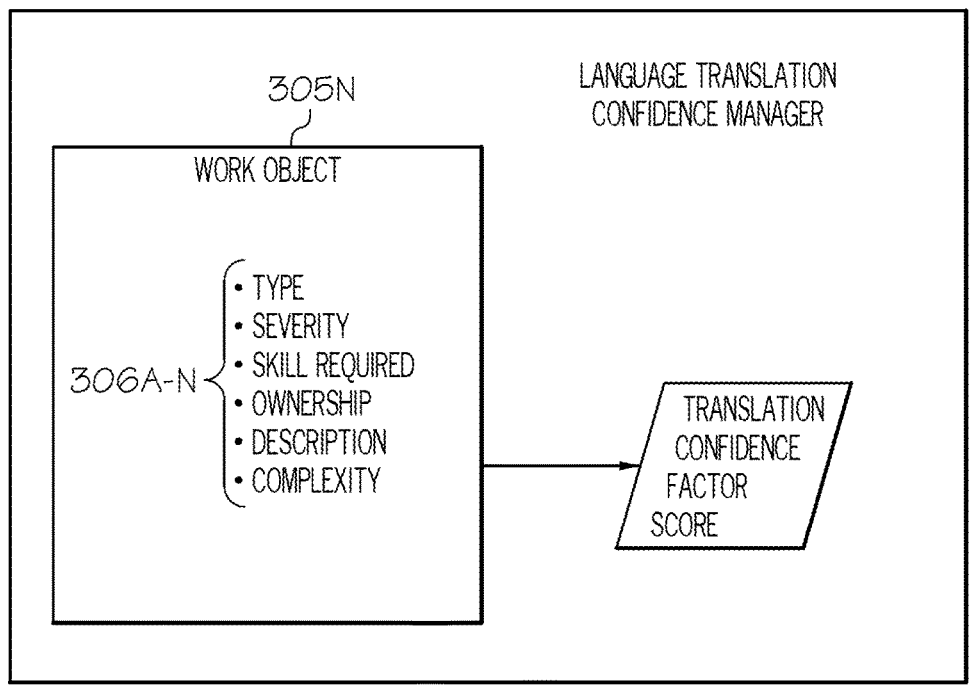
FIGS. 3A and 3B show system components according to illustrative embodiments.
Figure 3B:
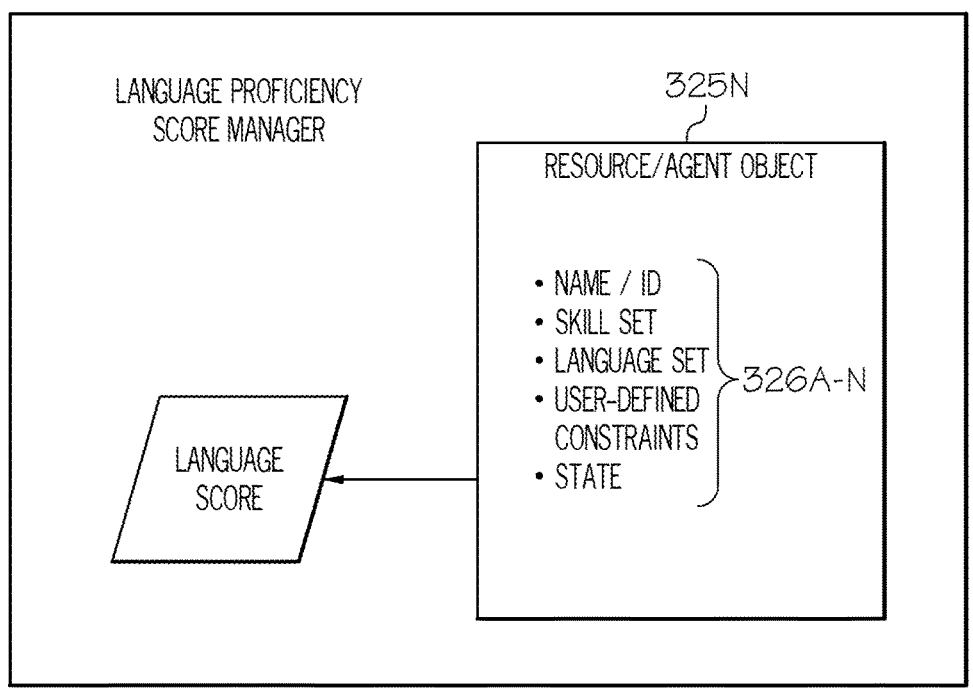

As shown in FIG. 3B, a Resource 325N can have any of a number of Resource Attributes 326A-N. These Resource Attributes 326A-N include, but are not limited to, a technical skill set, a spoken language set, a language skill, a user-defined constraint, a work schedule, and a physical or a logical location. An example of technical skills can include, but is not limited to, knowledge possessed by a resource concerning how to address a problem presented by a customer in a customer communication. A spoken language set can include, but is not limited to, a natural language known by a resource. Examples of a language skill can include, but are not limited to, a resource's proficiency in a natural language. A user-defined constraint may include, but is not limited to, a request for a resource with a particular attribute. A work schedule may include, but is not limited to, a period during which a resource is available to service customer communications in a work management system. An example of a physical location may include, but is not limited to, a relative distance between an agent and a customer, while a logical location may include, but is not limited to, a communications relaying, which may include carrier charges and may be rerouted based on these charges, between a customer and a resource. In any case, Resource Attributes 326A-N may be analyzed by Work Management System 201 (FIG. 2) to determine whether a resource is currently available in Resource Pool 220 and whether the resource is currently constrained with a communication from a customer.

Referring back to FIG. 2, Language Proficiency Score Manager 230 assigns each Resource 225N (of Resources 225A-N) a Language Proficiency Score 235 in any and all languages in which Resource 225N is skilled. Generally, Language Proficiency Scores 235 are associated with each Resource 225N based on a direct relation of his/her skill level for that language. Skills and proficiency may be determined by any objective or subjective manner now known or later determined, including, for instance, standard examination or estimation by the resource him/herself.

By way of illustrative example, Resource 225B may have French as her primary language (Language Proficiency Score=100), and may also know English as a second language, but may have less fluency in English (Language Proficiency Score=90). Also by way of illustrative example, Resource 225C may be able to read German pretty well but not be able to hold a conversation in German with consistency (Language Proficiency Score=50). As shown in FIG. 4, Language Proficiency Scores 435 may be stored in a Resource Language Skill/Proficiency Score Table 402.

Referring back to FIG. 2, Work Queue 200 in Work Management System 201 of a Customer Support Environment is shown. Work Queue 200 comprises one or more Work Objects 205A-N. Work Objects 205A-N can include any communication or transmission from a customer or other user of the customer support system, including a call/problem management, email, phone switch, chat/instant messaging, content management, etc. A Work Object 205N may enter Work Queue 200, for example, but not limited to, when Work Management System 201 receives a new communication from a customer, or when all resources are unavailable and a customer communication is placed on hold in Work Queue 200.

As shown in FIG. 3A, Work Object 305N includes any of a number of Work Attributes 306A-N. Work Attributes 306A-N can include, but are not limited to, a type of work (e.g., a classification of work based on a technical field), a severity of customer problem (e.g., low, medium, or high impact on the customer), a problem description (e.g., a description of a technical difficulty encountered by a customer, offered by the customer, or parsed from a customer communication), a problem complexity (e.g., a level of difficulty such as low, medium, or high associated with the technical problem of the work object), a customer identity (e.g., a preferred customer or a customer with whom there is a service level agreement), a customer information (e.g., a customer history or associated service level agreement), a product information (e.g., a technical schematic), a component information (e.g., a technical schematic or repair history), an additional skill of agent required (e.g., a technical skill of an agent necessary to address features of the work object), a language required (e.g., an optimal language in which to communicate between a resource and customer), a contract term and/or condition (e.g., a warranty, service level agreement, or other limit on service), and a criteria of responses required (e.g., a customer defined constraint for a response with a particular attribute). As Work Object 305N waits in Work Queue 200 (FIG. 2), its time in the queue or age is also associated with the work object and periodically updated.

Referring back to FIG. 2, Language Translation Confidence Manager 210 is further shown. When a new work item enters Work Management System 201, the system may attempt to match the new work to an Agent or Resource 225N having a language skill matching the new work item. However, if, for instance, resources are unavailable or there are current or upcoming constraints for a particular set of resources (e.g. language, skill set, etc.), Work Management System 201 will initiate Language Translation Confidence Manager 210 to aid in finding an alternative resource.

Language Translation Confidence Manager 210, in some embodiments, receives at least one Work Object 205N from Work Queue 200. It is envisioned that in some embodiments Language Translation Confidence Manager 210 may alternatively receive at least one Work Object 205N as incoming new work, without the at least one Work Object 205N having passed through Work Queue 200. Language Translation Confidence Manager 210 determines an initial language of Work Object 205N or a language attribute of Work Object 205N. Language Translation Confidence Manager 210 also determines a list of languages, which may include the initial language of Work Object 205N, which Resource Pool 220 can support based on the language skills of Agents or Resources 225A-N within Resource Pool 220.

In some embodiments, Language Translation Confidence Manager 210 may be configured to determine what language translations (i.e., from Work Object 205N language to Resource Pool 220 supported language) are supported by existing or available translation technology. This may also include, for example, service level agreements limiting service to certain translation services, or limitations of Work Management System 201 in which only some translation services supporting only some languages are available.

Furthermore, Language Translation Confidence Manager 210 translates Work Object 205N (e.g., text, spoken language capture, etc.) into one or more languages supported by Resource Pool 220. The translation may be accomplished by any means now or later known (e.g., machine translation, human translation, etc.).

Language Translation Confidence Manager 210 also assigns a Confidence of Translation Score 215 to each of these translations. The Confidence of Translation Score 215 is a representation of the accuracy of translating Work Object 205N from one language to another. To do this, in some embodiments, Translation Confidence Manager 210 may analyze Work Object 205N text or a transcription thereof for each language to produce Confidence of Translation Score 215 and Translation Confidence Manager 210 may use any technology now known or later developed, including, but not limited to, user feedback or machine confirmation. For example, Translation Confidence Manager 210 may consider the clarity with which a translation refers to a computer error code a customer is receiving as expressed in the original work item. In assessing a confidence of translation, Translation Confidence Manager 210 may analyze some of, but not necessarily all of, and not limited to just, Work Attributes 306A-N listed above.

As shown in FIG. 4, Translation Scores 415 may be stored in a Language Translation Score Table 404 for each customer communication. By way of illustrative example, in Table 404, translating from English to Spanish has a 90% confidence that Translation Confidence Manager 210 (FIG. 2) will accurately represent an issue. However, translating from English to French only has a 60% confidence that the translation will accurately describe an issue.

Referring now back to FIGS. 2 and 4, for each language of each available Resource 225N, a Confidence Factor 445 (Confidence Factor 245 in FIG. 2) is calculated from the resource's associated Language Proficiency Score 435 (Language Proficiency Score 235 in FIG. 2) for each resource language and Translation Score 415 (Translation Score 215 in FIG. 2) for that language. In some embodiments, Confidence Factor 445 may be calculated by arithmetically combining Proficiency Score 435 and Translation Score 415 to yield a Confidence Factor 445 as follows:

$$P+T=C$$

where:
P=Proficiency Score;
T=Translation Score; and
C=Confidence Factor.

Other means of calculating Confidence Factor 445 are also envisioned, and this disclosure should not be construed as limiting. For example, in some embodiments, Confidence Factor 445 may be calculated as the average or weighted average (with one score awarded a higher weight than the other) of Proficiency Score 435 and Translation Score 415. In some embodiments, Confidence Factor 445 may be normalized, (e.g., out of a score of 100%). In other embodiments, additional scores may be included in the calculation of Confidence Factor 445, such as resource technical skill or average duration of calls.

Illustrative, non-limiting, calculations of Confidence Factor 445 will now be demonstrated with reference to the tables in FIG. 4. In FIG. 4, Resource Language Skill/Proficiency Table 402 comprises Proficiency Scores 435 assigned by Language Proficiency Score Manager 230 (FIG. 2). Resource 1 knows English very well (Proficiency Score=100), and has a working knowledge of French (Proficiency Score=75). Resource 2 meanwhile speaks German quite well (Proficiency Score=90), but can only communicate in basic Spanish (Proficiency Score=60). Resource 3 on the other hand communicates fairly well in English (Proficiency Score=80) and quite well in Spanish (Proficiency Score=90).

In FIG. 4, Language Translation Score Table 404 comprises Translation Scores 415 assigned by Language Translation Confidence Manager 210 (FIG. 2). Translation Confidence Manager 210 translates Work Object 205N into one or more languages supported by the available resources (by way of non-limiting example, here English, French, Spanish, and German), and analyzes each translation to determine a confidence of translation for each language (by way of non-limiting example, here, English=95, French=75, Spanish=90, and German=50).

As shown in FIG. 4, Confidence Factor Table 406 comprises Confidence Factors 445 calculated by Confidence Factor Manager 240 (FIG. 2). Confidence Factor Manager 240 combines Proficiency Scores 435 and Translation Scores 415 for each resource and language to yield Confidence Factors 445 in table 406. This creates a list of confidence factors which may be ordered by resource and/or language.

Referring back to FIG. 2, Confidence Factor Manager 240 further comprises a set of Life Cycle Priority Threshold Curves 250. By plotting confidence factors against time, a Life Cycle Priority Threshold Curve 250 describes the minimum acceptable confidence factor for assigning Work Object 205N to Resource 225N for a given age of Work Object 205N in Work Queue 200. By comparing Confidence Factors 245 against a Life Cycle Priority Threshold Curve 250, Confidence Factor Manager 240 yields a set of resources with sufficiently high resource language proficiency and work translation quality to potentially be assigned to the work object.

If at a given time/age, no Resource 225A-N has an associated Confidence Factor 245 above Threshold Curve 250, Work Object 205N aging in the queue will remain there. In some embodiments, Confidence Factor Manager 240 may later, (e.g., after a time increment), again compare the associated Confidence Factors 245 of Resource 225A-N to Threshold Curve 250. During this later time period, some resources which were earlier available in Resource Pool 220 may become unavailable, (e.g., as agents' shifts end or as some agents become constrained with communications from other customers). Moreover, other resources may become available in Resource Pool 220 that were not available earlier.

In some embodiments, Confidence Factor Manager 240 may comprise a set of Life Cycle Priority Threshold Curves 250 corresponding to a set of levels of priority for customer communications/work objects. For example, a high priority communication may have a high initial minimum confidence factor, but may also decay quickly in order, for instance, to balance having a skilled person attend to the communication and having the communication answered promptly quickly. A lower priority call may be assigned a threshold curve with a lower initial minimum confidence factor, but the minimum confidence factor may then decay more slowly. In some embodiments, the threshold curve may have two or more sections with distinct slopes: an initial gradual slope where the minimum confidence factor is high, and a subsequent steep slope where the minimum confidence factor decays quickly if the communication is not attended to promptly.

Figure 5:
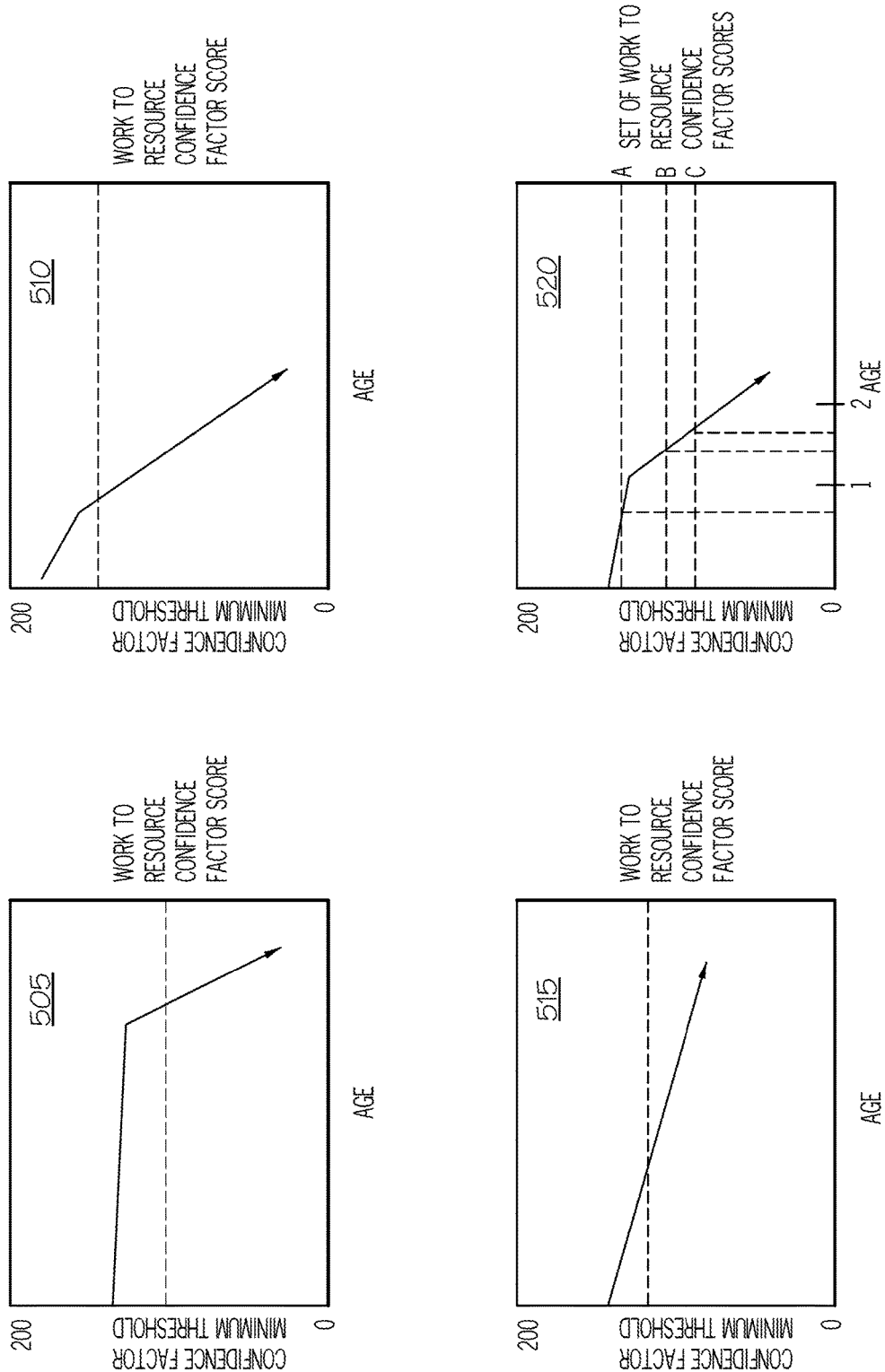
FIG. 5 shows threshold curves according to illustrative embodiments.

Threshold curves according to illustrative embodiments are shown in FIG. 5. In one illustrative embodiment, low priority Threshold Curve 505 is shown where, with relatively lower priority work, the minimum confidence factor threshold may remain higher for a longer period of time prior to dropping in order to accept a lower work to resource confidence factor score. This balances the risk in matching a poorer translation or less skilled language resource.

In another illustrative embodiment, high priority Threshold Curve 510 is shown, where, with relatively high priority work, the threshold may start higher, but drop quickly over time in order, for instance, to meet responsiveness criteria in getting the work to someone. A high priority threshold curve may also be utilized to assign high priority items to low risk translations and low risk resources in order to guarantee a better customer experience.

In yet another illustrative embodiment, intermediate priority Threshold Curve 515 shows that some threshold curves may have no increased responsiveness after work has aged in the queue. Instead, some threshold curves may simply be linear over time as to when the work becomes eligible. Although shown as one or more linear curves in illustrative FIG. 5, Life Cycle Priority Threshold Curve 250 may include any function or set of functions.

In still yet another illustrative embodiment, Threshold Curve 520 shows a set of confidence factor scores intersecting with a priority threshold curve. At time "1", only confidence factor "A" is above the priority threshold curve. Therefore, only the resource associated with confidence factor "A" would be considered eligible to be assigned the work item waiting the queue (Potential Resource 255). However, at time "2", confidence factors "A", "B", and "C" are all above the priority threshold curve. Therefore, the resources associated with confidence factors "A", "B", and "C" are all Potential Resources 225 which may be eligible to be assigned the work item waiting the queue.

Generally, when a Work Object 205N enters Work Management System 201 in its original language (e.g., English), all available Resources 225A-N in Resource Pool 220 are considered to assign Work Object 205N to. If all resources in the original language are busy or highly constrained, Work Management System 201 may translate Work Object 205N into a second language of one of Resources 225A-N. Work Management System 201 may translate Work Object 205N if it is determined that there is a Confidence Factor 245 associated with a language and Resource 225N that meets a minimum threshold requirement of Life Cycle Priority Threshold Curve 250. Generally, if multiple resources in multiple languages meet the minimum threshold requirement, the resource with the highest Confidence Factor 245 will be selected. For example, in FIG. 4, Table 406 shows that Resource 1's English would be preferable, but Resource 3's Spanish would be the next best choice if Resource 1 is not available.

Furthermore, referring to FIG. 2, Confidence Factor Manager 240 identifies one or more Potential Resources 255 which may be assigned Work Object 205N and passes a list or other description of Potential Resources 255 to Business Rules Processor 260. In some embodiments, the presence of Business Rules Processor 260 is optional and, in some embodiments, work objects will be assigned to resources immediately after passing through Confidence Factor Manager 240 without going through a Business Rules Processor 260.

However, in embodiments where Business Rules Processor 260 is present, the processor applies logic to determine if Work Object 205N is a candidate for language translation and, if so, to which resource it will be assigned. In some embodiments, Business Rules Processor 260 selects one of the set of Potential Resources 255 and assigns Work Object 205N to the Selected Resource 265 in Assignment of Work 270.

Once Business Rules Processor 260 has identified Work Object 205N and Potential Resources 255, additional business rules may be applied to identify an optimal resource and language translation for Work Object 205N. Business Rules Processor 260 may be configured to consider, inter alia, availability and other constraints of Resource Pool 220 and set of Potential Resources 255.

In a non-limiting example, Business Rules Processor 260 may be configured to select the resource with the highest Confidence Factor 245 or Language Proficiency Score 230 from Potential Resources 255. In another non-limiting example, Business Rules Processor 260 may be configured to calculate a combined risk assessment for the various language-resource combinations and assign Work Object 205N to the resource associated with the translated language-resource combination with the lowest combined risk.

Business Rules Processor 260 may also be configured to define/calculate thresholds based on constrained resources. In some embodiments, these thresholds may be dynamically calculated based on (other) work item and/or resource attributes, including, but not limited to, work item severity, age in queue, resource availability schedule, resource skill constraints, etc. These and other attributes of work items and/or resource attributes may be defined and easily changed/updated by Business Rules Processor 260 (e.g., to accommodate current work queue conditions and acceptable risks).

Furthermore, Business Rules Processor 260 may be configured to determine if a resource would be constrained by assigning Work Object 205N to that Resource. By way of a non-limiting example, Resource Pool 220 may show that a resource is the only, or one of only, a few resources available for that language or that the selected language is very limited across Resource Pool 220. In response to this indication, Business Rules Processor 260 may select to not assign that resource to Work Object 205N in order, for instance, to preserve the resource for higher priority work in his/her native language. Business Rules Processor 260 is further configured to analyze confidence factors of other Potential Resources 255 to determine a different translation language and resource to be used for Work Object 205N.

Furthermore, Business Rules Processor 260 may be configured to consider constraints on resources. By way of non-limiting example, Business Rules Processor 260 may be configured to deny assigning an easy Work Object 205N to a resource who has a rare (i.e., a language skill that nobody else has) or highly sought language skill. In some embodiments, in enacting this constraint, Business Rules Processor 260 would omit the available resource with the valuable language skill from the list of available resources and languages.

Moreover, Business Rules Processor 260 may be configured to consider other constraints, including historical tracking of incoming work. By way of non-limiting example, with historical tracking, a system (e.g., Work Management System 201) may predict types of work problems which will likely enter the system next. Business Rules Processor 260 may be configured to make free/available certain language skills for upcoming work items.

In some embodiments, Business Rules Processor 260 may determine that no translation into a language offered by set of Potential Resources 255 is suitable for Work Object 205N. In this case, Work Object 205N will be returned to Work Queue 200 where at a later time it may be assigned to a translated language resource. Work Object 205N may also be returned to Work Queue 200 where it is subsequently assigned to a resource in the same language as Work Object 205N.

In any case, once Selected Resource 265 has been chosen by Business Rules Processor 260 (or in some embodiments Confidence Factor Manager 240), it can be assigned Work Object 205N in Assignment of Work 270. As stated above, any means now known or later developed may be used to translate Work Object 205N into the language of Selected Resource 265 so that Work Object 205N may be worked. In some embodiments, typical business approaches are envisioned for how Work Object 205N is responded to (e.g., the response of Selected Resource 265 to Work Object 205N may be translated back to the original language of Work Object 205N).

Figure 6:
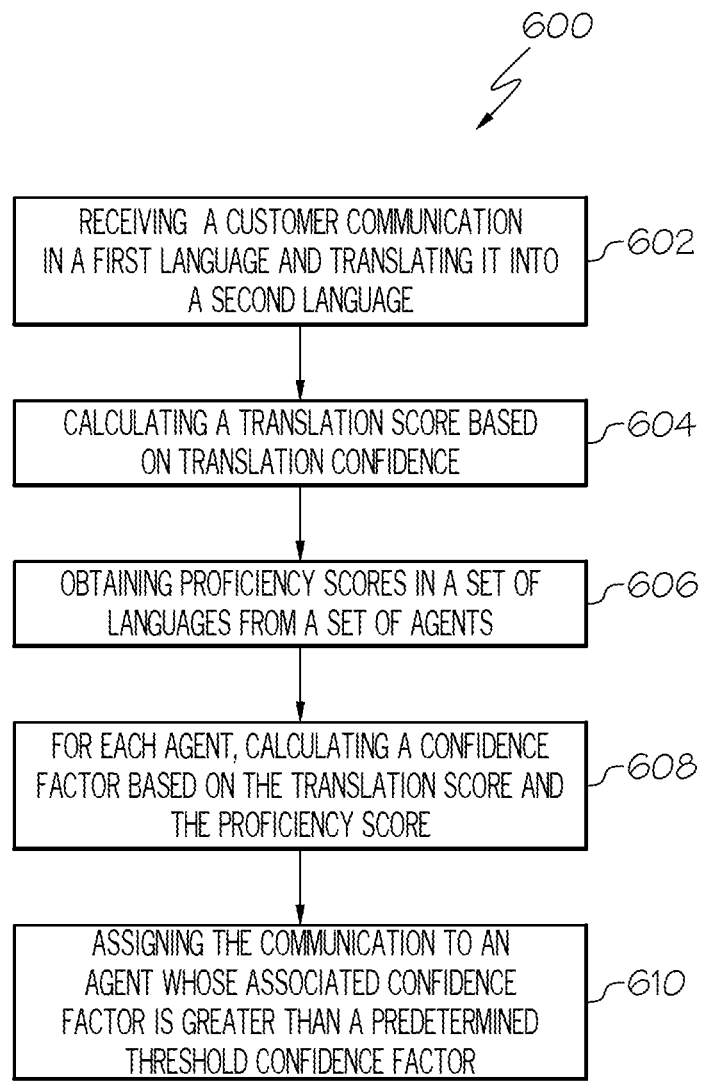
FIG. 6 shows a process flow for assigning work in a customer support environment according to illustrative embodiments.

As depicted in FIG. 6, a system (e.g., computer system 12) carries out the methodologies disclosed herein. Shown is a process flow 600 for assigning work in a customer support environment. At step 602, a customer communication in a first language is received and translated it into a second language. At step 604, a translation score based on translation confidence is calculated. At step 606, proficiency scores are obtained in a set of languages from a set of agents. At step 608, for each agent, a confidence factor is calculated based on the translation score and proficiency score. At step 610, the communication is assigned to an agent whose associated confidence factor is greater than a predetermined threshold confidence factor.

Process flow 600 of FIG. 6 illustrates the architecture, functionality, and operation of possible implementations of systems, methods, and computer program products according to various embodiments of the present invention. In this regard, each block in the flowchart may represent a module, segment, or portion of code, which comprises one or more executable instructions for implementing the specified logical function(s). It should also be noted that, in some alternative implementations, the functions noted in the blocks might occur out of the order depicted in the figures. For example, two blocks shown in succession may, in fact, be executed substantially concurrently. It will also be noted that each block of flowchart illustration can be implemented by special purpose hardware-based systems that perform the specified functions or acts, or combinations of special purpose hardware and computer instructions.

Some of the functional components described in this specification have been labeled as systems or units in order to more particularly emphasize their implementation independence. For example, a system or unit may be implemented as a hardware circuit comprising custom VLSI circuits or gate arrays, off-the-shelf semiconductors such as logic chips, transistors, or other discrete components. A system or unit may also be implemented in programmable hardware devices such as field programmable gate arrays, programmable array logic, programmable logic devices or the like. A system or unit may also be implemented in software for execution by various types of processors. A system or unit or component of executable code may, for instance, comprise one or more physical or logical blocks of computer instructions, which may, for instance, be organized as an object, procedure, or function. Nevertheless, the executables of an identified system or unit need not be physically located together, but may comprise disparate instructions stored in different locations which, when joined logically together, comprise the system or unit and achieve the stated purpose for the system or unit.

Further, a system or unit of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices and disparate memory devices.

Furthermore, systems/units may also be implemented as a combination of software and one or more hardware devices. For instance, program/utility 40 may be embodied in the combination of a software executable code stored on a memory medium (e.g., memory storage device). In a further example, a system or unit may be the combination of a processor that operates on a set of operational data.

As noted above, some of the embodiments may be embodied in hardware. The hardware may be referenced as a hardware element. In general, a hardware element may refer to any hardware structures arranged to perform certain operations. In one embodiment, for example, the hardware elements may include any analog or digital electrical or electronic elements fabricated on a substrate. The fabrication may be performed using silicon-based integrated circuit (IC) techniques, such as complementary metal oxide semiconductor (CMOS), bipolar, and bipolar CMOS (BiCMOS) techniques, for example. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor devices, chips, microchips, chip sets, and so forth. However, the embodiments are not limited in this context.

Any of the components provided herein can be deployed, managed, serviced, etc., by a service provider that offers to deploy or integrate computing infrastructure with respect to a process for assigning work in a customer support environment. Thus, embodiments herein disclose a process for supporting computer infrastructure, comprising integrating, hosting, maintaining and deploying computer-readable code into a computing system (e.g., computer system 12), wherein the code in combination with the computing system is capable of performing the functions described herein.

In another embodiment, the invention provides a method that performs the process steps of the invention on a subscription, advertising and/or fee basis. That is, a service provider, such as a Solution Integrator, can offer to create, maintain, support, etc., a process for assigning work in a customer support environment. In this case, the service provider can create, maintain, support, etc., a computer infrastructure that performs the process steps of the invention for one or more customers. In return, the service provider can receive payment from the customer(s) under a subscription and/or fee agreement, and/or the service provider can receive payment from the sale of advertising content to one or more third parties.

Also noted above, some embodiments may be embodied in software. The software may be referenced as a software element. In general, a software element may refer to any software structures arranged to perform certain operations. In one embodiment, for example, the software elements may include program instructions and/or data adapted for execution by a hardware element, such as a processor. Program instructions may include an organized list of commands comprising words, values, or symbols arranged in a predetermined syntax that, when executed, may cause a processor to perform a corresponding set of operations.

The present invention may also be a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

It is apparent that there has been provided approaches to assign work in a customer support environment. While the invention has been particularly shown and described in conjunction with exemplary embodiments, it will be appreciated that variations and modifications will occur to those skilled in the art. Therefore, it is to be understood that the appended claims are intended to cover all such modifications and changes that fall within the true spirit of the invention.

What is claimed is:

1. A method for assigning work in a customer support environment, the method comprising the computer-implemented steps of:

translating a customer communication received in a first language into a second language, the translation having a confidence of translation;

obtaining a set of agents, each agent of the set of agents having an associated confidence factor based upon the confidence of translation and a language proficiency of the agent in at least one of the first language or the second language;

generating a threshold confidence factor curve comprising a first curve, having a first rate of decrease over a first wait time period of the customer communication, and a second curve, having a second rate of decrease over a second wait time of the customer communication, the second rate of decrease being greater than the first rate of decrease; and assigning, at a time, the customer communication to one of the set of agents based on the associated confidence factor being greater than the threshold confidence factor curve at the time.

2. The method of claim 1, further comprising the computer-implemented step of determining, in response to the received customer communication, whether an agent having a required proficiency in the first language is available to service the customer communication.

3. The method of claim 1, further comprising the computer-implemented steps of:

weighting the associated confidence factors against a wait time of the customer communication on the threshold confidence factor curve; and assigning the customer communication to the one of the set of agents based on the weighting.

4. The method of claim 1, further comprising the computer-implemented step of placing the customer communication in a queue in the case that none of the set of agents has an associated confidence factor greater than the threshold confidence factor curve at the time.

5. The method of claim 1, further comprising the computer-implemented step of assigning the customer communication to the one of the set of agents only in the case that a rule optimizing agent availability and risk of constrained resources is satisfied.

6. The method of claim 1, wherein the language proficiency is based on one or more of: a skill set, a language set, a user-defined constraint, and a physical or logical location of the agent relative to the customer.

7. The method of claim 1, wherein the confidence of translation is based on one or more of: a type of work, a severity of a customer problem, a problem description, a problem complexity, a customer identity, a customer information, a product information, a component information, an additional skill of an agent required, a language required, a contract term and condition, and a criteria of responses required.

8. A system for assigning work in a customer support environment, comprising:

a memory medium comprising program instructions;
a bus coupled to the memory medium; and
a processor, for executing the program instructions, coupled to a confidence factor management engine via the bus that when executing the program instructions causes the system to:

translate a customer communication received in a first language into a second language, the translation having a confidence of translation;

obtain a set of agents, each agent of the set of agents having an associated confidence factor based upon the confidence of translation and a language proficiency of the agent in at least one of the first language or the second language;

generate a threshold confidence factor curve comprising a first curve, having a first rate of decrease over a first wait time period of the customer communication, and a second curve, having a second rate of decrease over a second wait time of the customer communication, the second rate of decrease being greater than the first rate of decrease; and assign, at a time, the customer communication to one of the set of agents based on the associated confidence factor being greater than the threshold confidence factor curve at the time.

9. The system of claim 8, the program instructions further causing the system to determine, in response to the received customer communication, whether an agent having a required proficiency in the first language is available to service the customer communication.

10. The system of claim 8, the program instructions further causing the system to:

weight the associated confidence factors against a wait time of the customer communication on the threshold confidence factor curve; and assign the customer communication to the one of the set of agents based on the weighting.

11. The system of claim 8, the program instructions further causing the system to place the customer communication in a queue in the case that none of the set of agents has an associated confidence factor greater than the threshold confidence factor curve at the time.

12. The system of claim 8, the program instructions further causing the system to assign the customer communication to the one of the set of agents only in the case that a rule optimizing agent availability and risk of constrained resources is satisfied.

13. The system of claim 8, wherein the language proficiency is based on one or more of: a skill set, a language set, a user-defined constraint, and a physical or logical location of the agent relative to the customer.

14. The system of claim 8, wherein the confidence of translation is based on one or more of: a type of work, a severity of a customer problem, a problem description, a problem complexity, a customer identity, a customer information, a product information, a component information, an additional skill of an agent required, a language required, a contract term and condition, and a criteria of responses required.

15. A computer program product for assigning work in a customer support environment, the computer program product comprising a computer readable storage device, and program instructions stored on the computer readable storage device, to:

translate a customer communication received in a first language into a second language, the translation having a confidence of translation;

obtain a set of agents, each agent of the set of agents having an associated confidence factor based upon the confidence of translation and a language proficiency of the agent in at least one of the first language or the second language;

generate a threshold confidence factor curve comprising a first curve, having a first rate of decrease over a first wait time period of the customer communication, and a second curve, having a second rate of decrease over a second wait time of the customer communication, the second rate of decrease being greater than the first rate of decrease; and assign, at a time, the customer communication to one of the set of agents based on the associated confidence factor being greater than the threshold confidence factor curve at the time.

16. The computer program product of claim 15, the computer readable storage device further comprising program instructions to:
   weight the associated confidence factors against a wait time of the customer communication on the threshold confidence factor curve; and
   assign the customer communication to the one of the set of agents based on the weighting.

17. The computer program product of claim 15, the computer readable storage device further comprising program instructions to:
   determine, in response to the received customer communication, whether an agent having a required proficiency in the first language is available to service the customer communication; and
   place the customer communication in a queue in the case that none of the set of agents has an associated confidence factor greater than the threshold confidence factor curve at the time.

18. The computer program product of claim 15, the computer readable storage device further comprising program instructions to assign the customer communication to the one of the set of agents only in the case that a rule optimizing agent availability and risk of constrained resources is satisfied.

19. The computer program product of claim 15, wherein the language proficiency is based on one or more of: a skill set, a language set, a user-defined constraint, and a physical or logical location of the agent relative to the customer.

20. The computer program product of claim 15, wherein the confidence of translation is based on one or more of: a type of work, a severity of a customer problem, a problem description, a problem complexity, a customer identity, a customer information, a product information, a component information, an additional skill of an agent required, a language required, a contract term and condition, and a criteria of responses required.

* * * * *